O. ZERK.
GREASE CUP.
APPLICATION FILED AUG. 16, 1911.

1,049,027.

Patented Dec. 31, 1912.

Witnesses

Inventor
Oscar Zerk,
By Albert H. Bates
Atty.

UNITED STATES PATENT OFFICE.

OSCAR ZERK, OF CLEVELAND, OHIO, ASSIGNOR TO THE ZERK MANUFACTURING COMPANY, OF CLEVELAND, OHIO, A CORPORATION OF OHIO.

GREASE-CUP.

1,049,027.  Specification of Letters Patent.  Patented Dec. 31, 1912.

Application filed August 16, 1911. Serial No. 644,424.

*To all whom it may concern:*

Be it known that I, OSCAR ZERK, a subject of the Emperor of Austria-Hungary, residing at Cleveland, in the county of Cuyahoga and State of Ohio, have invented a certain new and useful Improvement in Grease-Cups, of which the following is a full, clear, and exact description, reference being had to the accompanying drawings.

The object of this invention is to provide a very neat and efficient grease cup of the type wherein an internally threaded cap screws downwardly over an externally threaded stationary tubular member, which may be called the cup.

In this invention I provide a simple and effective spring detent device preventing inopportune rotation of the cap. I arrange this device so that the cap may be rotated freely in a direction to feed the grease but is prevented from rotating in the opposite direction, while, by a very simple movement the detent device is thrown to inoperative position to enable such backward rotation for removing the cap. The detent device is under the pressure of a spring which surrounds the shank of the cup. To form a stop for this spring I provide a washer pressed into a circular groove in the shank. This construction is also included within my invention.

My invention may be conveniently summarized as comprising the combinations of coöperating parts hereinafter explained and set out in the claims.

Figure 1:
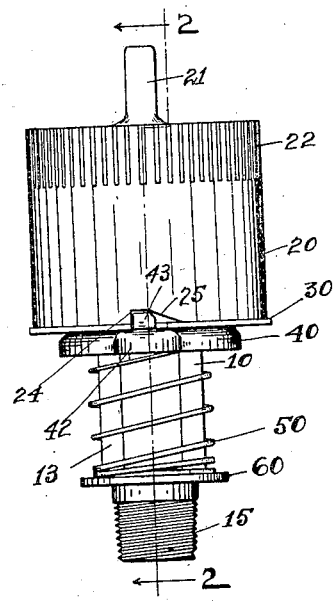
Figure 2:
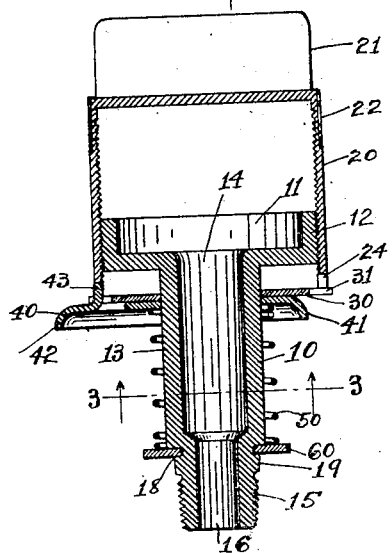
Figure 3:
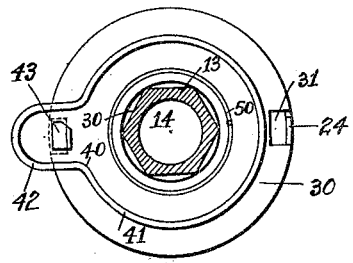

In the drawings, Figure 1 is a side elevation of the grease cup; Fig. 2 is a vertical central section through the same on a plane indicated by the line 2—2 of Fig. 1; Fig. 3 is a bottom plan on the line 3—3 of Fig. 2.

Referring to the parts by reference numerals, 10 represents the stationary or cup member and 20 the movable or cap member. The cup member has an outwardly extending cup-like head 11 with a cylindrical externally threaded wall 12. Leading downwardly from this head is a shank 13 which is shown as having a hexagonal interior and a cylindrical bore 14. Below the hexagonal portion is a reduced externally threaded portion 15 having a bore 16 communicating with the bore 14. The hexagonal exterior 13 furnishes convenient means for the application of a wrench to install the cup.

The cap 20 is internally threaded substantially throughout its length and screws downwardly over the head 11, compressing the grease in the cup and forcing it downwardly through the bores 14 and 16, as is well understood. To turn the cap I provide it with an outwardly projecting flat diametric extension 21, which is preferably integral with the cap. I also prefer to knurl the upper portion of the cylindrical wall of the cap, as shown at 22.

Surrounding the shank 13 of the cup is a washer 30. This washer has a hexagonal hole sliding easily on the shank to prevent the washer rotating. Beneath the washer 30 and loosely surrounding the shank 13 is a member 40. This member has a circular central hole so that it may turn as well as slide on the hexagonal shank. It is preferably flanged downwardly at its edges, as shown at 41, and it is provided with an arm or extension 42 projecting beyond the cap and formed with an upwardly extending tongue 43 in alinement with the wall of the cap. This tongue is adapted to extend through a notch 31 in the washer 30 into a notch 24 in the lower edge of the cap and it is normally held in that position by a helical spring 50 which surrounds the shank 30 and is compressed between the member 40 and a stationary projection 60 near the base of the shank.

It will be seen that the tongue 43 projecting through the non-rotatable washer 30 into the cap 20 might prevent any rotation of that cap. However, it is desirable to allow the cap to turn freely in the direction to feed the grease, and, accordingly, I bevel the rear edge of the notch 24 as shown at 25 in Fig. 1, and I bevel also, in the corresponding direction, the upper edge of the tongue 43. In this way the tongue is adapted to hold the cap against rotation in the unscrewing direction while allowing it to be screwed on freely. I have shown the tongue as being integral with the arm and the disk 40 being punched upwardly from the arm, and this is a convenient construction. I have also shown two notches 30 diametrically opposite in the washer 30 and two diametrically opposite notches 24 in the cup. These are details, however, which may be changed as desired.

It will be observed that, by reason of the round hole through the locking member 40 it may be turned, as desired, about the shank 13 when it is released from the notches 24 and 30. Accordingly, when it is desired to turn the cup backwardly, it is only necessary to push downwardly on the arm 42 to free the tongue from the notches and then give the locking member a portion of the rotation to bring the tongue beneath the washer 30 between its notches. This holds the locking member inactive and the cup may be rotated freely in either direction, as desired.

I have found it very convenient to provide the stop for the spring 50 by means of an outward annular flange rigid with the shank. But to save material and labor in forming this flange I provide it in the form of a separate washer 60 which is forced into place in the circumferential groove 18 in the shank and bears against a flattened lower shoulder where the hexagonal portion joins the reduced extension. This forcing operation may conveniently be accomplished by slightly tapering the shank, as at 19, below the recess and making the washer 60 somewhat conical, and then forcing it, with the hole foremost, over the taper 19 and into its seat, the same forcing operation flattening the washer into the position shown.

Having thus described my invention, what I claim is:—

1. In a device of the character described, the combination of a member having a shank with a head externally threaded, an internally threaded cap screwing onto said member, a notch in the lower edge of the cap wall, a non-rotatable washer surrounding the shank of said member and having a notch, a locking device adapted to rotate on said shank and to project through the notch of the washer into the notch of the cap, and a spring acting on the locking device.

2. In a device of the character described, the combination of a cup having an angular shank and an externally threaded head, an internally threaded cap screwing onto said head, a washer slidably but non-rotatably mounted on the shank, a locking member rotatably mounted on the shank and provided with a tongue adapted to extend through registering notches in the washer and wall of the cap, and a spring bearing against the locking member.

3. In a grease cup, the combination, with a cup having a shank, of a cap screwing onto the cup, a washer non-rotatable but slidable on the shank, a locking member rotatably and movably surrounding the shank and provided with a tongue adapted to extend through registering notches in the washer and cap, a spring surrounding the shank and bearing against the locking member, and an outward flange on the shank against which the other end of the spring bears.

4. In a grease cup, the combination of a cup having an angular shank and an externally threaded head, an internally threaded cap screwing onto the head and having a notch in the lower edge of its wall, a washer having an angular opening surrounding the shank and held thereby against rotation and provided with a notch adapted to register with the notch in the cap wall, a locking member having a round opening surrounding the shank and provided with an arm from which extends a tongue adapted to occupy registering notches in the washer and cap, and a spring surrounding the shank and bearing against the locking member.

5. In a grease cup, the combination of a cup member having an externally threaded head and a shank, a cap screwing onto the cup, a washer surrounding the shank and provided with a notch adapted to register with a notch in the wall of the cap, a locking device surrounding the shank and adapted to occupy such registering notches, said washer and locking device coöperating and one of them being rotatable and the other non-rotatable, a spring surrounding the shank and bearing against the locking device, and a washer seating in a circumferential groove in the shank and forming a stop for the spring.

6. In a device of the character described, the combination of a cup having a head with an external thread and a shank with an angular exterior and an internal bore, an internally threaded cap screwing onto the head, a washer non-rotatably but slidably surrounding the angular shank, a locking member both rotatably and slidably surrounding the angular shank and provided with an extended arm having a tongue adapted to project into alined notches in the washer and cap wall, said locking member being provided with a downward flange, a coiled spring surrounding the shank of the cup and having its topmost coil within the flange of the locking member, and an outwardly extending rigid flange carried by the cup shank and forming a bottom abutment for the spring.

7. In a device of the character described, the combination of a cup having a head with external threads and a shank with an internal bore and a non-circular exterior, an internally threaded cap screwing onto the head, a washer slidably surrounding said shank, a locking member slidably surrounding said shank below the washer and provided with a tongue adapted to project into alined openings in the washer and cap wall, the said washer and locking member thus coöperating and one of them being rotatable and the other non-rotatable, said locking member being provided with a downward flange, and a coiled spring surrounding the shank of the cup and having its topmost coil within the flange of the locking member.

8. In a device of the character described, the combination of a member having a shank with a head externally threaded, an internally threaded cap screwing onto said member, there being a notch in the lower edge of the cap wall, a washer surrounding the shank of said member and having an opening, a locking device below the washer having a tongue adapted to project through the opening of the washer into the notch of the cap, the washer and locking device being both slidable on the shank and one of them but not the other being rotatable, and a spring tending to force the washer and locking device toward the cap.

In testimony whereof, I hereunto affix my signature in the presence of two witnesses.

OSCAR ZERK.

Witnesses:
 ALBERT H. BATES,
 BRENNAN B. WEST.